May 7, 1946.  H. G. DOSTER ET AL  2,399,794
INJECTOR
Filed July 13, 1943   2 Sheets-Sheet 2

Inventors
Howard G. Doster
Robert H. Hanlon
Fordyce B. Farnsworth
by M. H. Finnell Jr. Attorney Patented May 7, 1946

2,399,794

UNITED STATES PATENT OFFICE 2,399,794

INJECTOR

Howard G. Doster, Robert H. Hanlon, and Fordyce B. Farnsworth, Wadsworth, Ohio, assignors to The Ohio Injector Company, Wadsworth, Ohio, a corporation of Ohio Application July 13, 1943, Serial No. 494,524

19 Claims. (Cl. 103—271)

This application is a continuation-in-part of our application of similar title filed August 25, 1942, Serial No. 456,076.

The invention relates to injectors, particularly injectors of the non-lifting type, especially, though not limited to, those operating upon the principle of fixed steam inlet-adjustable water inlet, and it has to do principally with injectors for feeding water from a supply thereof to a boiler, especially from a locomotive tender tank to the locomotive boiler.

It has been found that when such injectors are graded (rate of delivery controlled) by graded adjustment of the valve which regulates the inlet of water to the injector from the source of supply (tender tank), particularly when the water valve is nearly closed, they will operate at such a fixed grading for an indeterminate period and then break (cease feeding).

We have observed that this breaking occurs when the temperature of the water in the delivery chamber of the injector exceeds a certain maximum temperature, and that the temperature increases inversely to the rate of feed of water through the inlet valve. Hence, in the case of an injector, for a locomotive boiler, for example where the water source is the tender tank, a fixed setting of the water inlet valve of the injector whereby grading is attained, will not function to maintain a constant predetermined rate of feed of water to the injector, and hence a substantially constant volume and temperature of water delivered by the injector, as the level of the water in the tender tank, and hence the pressure head of such water at the water valve, decreases as the tank empties.

Similarly, but not generally so prevalently, an increase in the temperature of the water fed to the injector will cause breaking for the reason that the delivery temperature will increase also.

Thus, in injectors of the type referred to as now operated, when, with a predetermined initial grading adjustment of the water inlet valve, the injector breaks after continued operation for an indefinite period, it is necessary, upon re-starting the injector, to further open the water inlet valve in order to accomplish the same grading as formerly obtained. This, we have determined, is required because of the decrease in pressure head, or increase in temperature, at the water inlet valve due, respectively, to lowering of the level of water in the tender tank, which results in a smaller volume of water passing the water inlet valve, or to a rise in temperature of the water in the tank with the same volume passing the water inlet valve.

The present invention contemplates a manner and means for correcting this unsatisfactory operating characteristic of injectors by adjusting, preferably automatically, the water inlet orifice to the injector to compensate for variations in the pressure head and/or temperature of the water fed to the injector.

Such adjustment may be responsive to conditions either outside or inside the injector and which reflect the pressure changes incident to variations in the pressure head of the water as it is fed to the water inlet valve of the injector. For example, where the pressure head only is the controlling factor, means directly responsive to such pressure head may be provided to increase the orifice for the admission of water to the injector as the pressure head decreases; or the water inlet control means may be actuated in response to such changes in positive or negative pressure (with respect to atmospheric pressure) within the injector body as will occur in the combining chamber, or in the water passages in advance of the lifting nozzle, respectively, such changes in positive and negative pressure having been demonstrated by us as having a determinable relation to the quantity of water entering the injector.

Where temperature of the feed water is a controlling factor, usually in addition to its pressure head, the water inlet control means will preferably be made to function in response to such changes in positive pressure within the injector body as will occur in the combining chamber.

Although it will be understood that the concept of the invention is not limited thereto, a number of physical embodiments of such concept will be described hereinafter, as falling within the terms of the appended claims.

In the accompanying drawings illustrating the invention, in the several figures of which like parts are similarly designated, Fig. 1 is an axial sectional elevation of an injector of conventional form showing one form of means for carrying out the practice of the invention, where the pressure conditions to which the water feed control is responsive are outside the injector.

Figure 3:
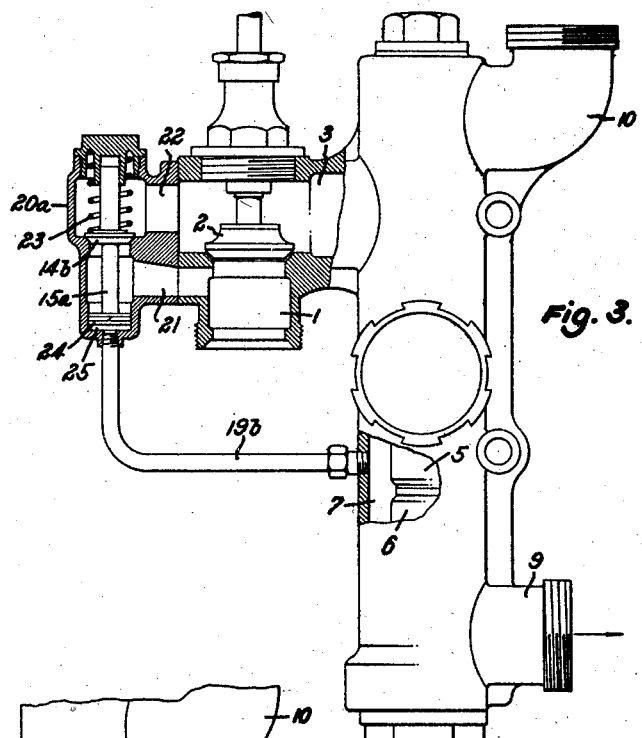
Fig. 3 is a view similar to Fig. 1 but showing a by-pass valve operating in response to positive pressure conditions within the injector.
Figure 4:
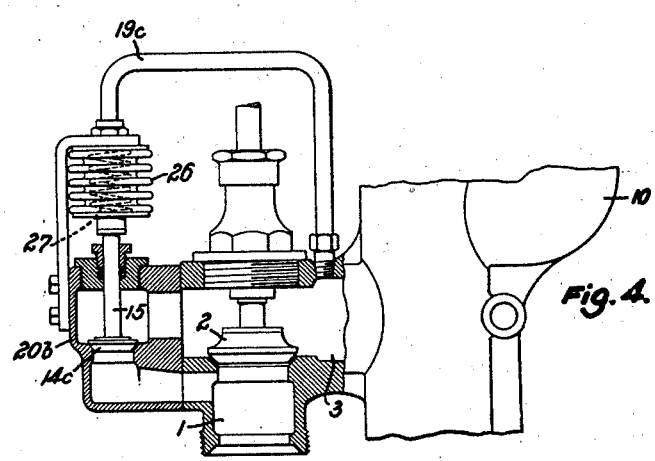
Figure 5:
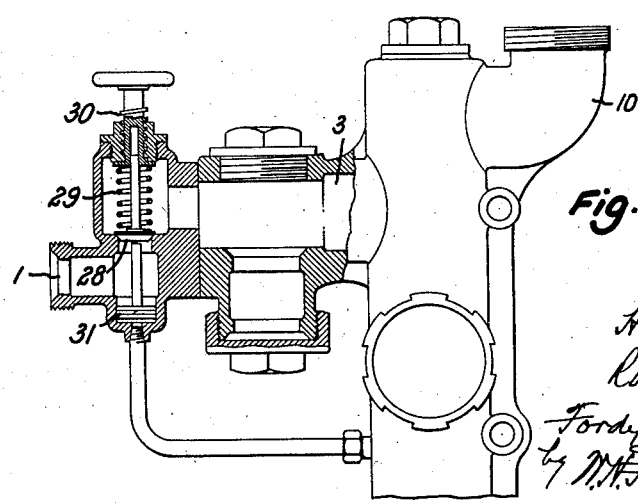

Fig. 4 is a fragmentary view similar to Fig. 3 but showing an embodiment in which the by-pass valve is responsive to negative pressure conditions within the injector, and Fig. 5 illustrates a further modification by means of which any desired delivery temperature, within a practical operating range, may be obtained, while at the same time maintaining a predetermined desired delivery volume commensurate with such temperature.

Figure 1:
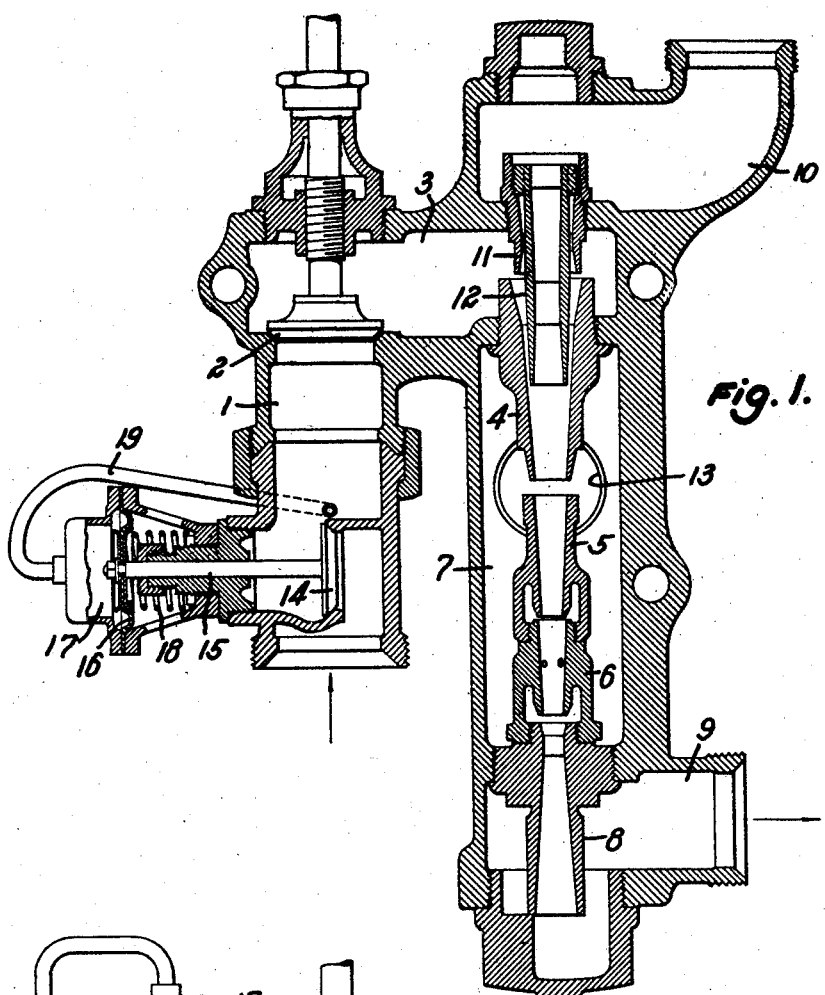

Referring particularly to Fig. 1, it will be seen that the injector, which is of conventional type, comprises a body providing a water inlet passage 1 controlled by a manually adjustable water inlet valve 2 and communicating through a water passage 3 with the lifting nozzle 4 of the usual tube assembly including combining tubes 5 and 6, located in the combining chamber 7, and the delivery tube 8 which discharges into the delivery passage 9. Steam is fed through the steam passage 10 to the lifting and forcing steam nozzles 11 and 12, respectively, and the combining chamber communicates through the overflow passage 13 with a conventional valve-controlled overflow (not shown) which is closed while the injector is operating to feed water.

In order to accomplish the desired control of admission of water to the injector responsive to the pressure head and/or the temperature of the water at the water inlet passage 1 so that grading, and particularly minimum grading, of the injector may be maintained despite fluctuation in such pressure head and/or temperature, as contemplated by the invention, various examples of valve arrangements and controls therefor are illustrated in the drawings and their functional aptitudes hereinafter separately described, but, as hereinbefore stated, these examples are not exclusive of others which might be devised for the purpose of the invention within the scope of the appended claims.

In Fig. 1 there is provided as an adjunct to the water passage 1 a pressure-responsive valve 14 the stem 15 of which is connected with a diaphragm 16 having one side open to atmosphere and its other side in communication with a pressure chamber 17. The valve 14 is biased to open position, against pressure in chamber 17 acting upon diaphragm 16, by a spring 18 the expansive valve-opening force of which is properly adjusted to meet normal conditions of injector operation. Connection between the water inlet passage and the pressure chamber 17 of the diaphragm is provided by a pipe 19 which, as shown, communicates with the water passage at a point inside the valve 14.

With this valve arrangement, it will be understood that the water inlet valve 2 will be set to proper open position for desired grading of the injector, and the strength of spring 18 will be such, or the spring may be so adjusted in any appropriate manner, as to cause the valve 14 to be held open to an extent sufficient to permit admission past it of just the proper amount of water for which the water valve 2 is adjusted at the pressure head obtaining (the temperature of the feed water not being considered). Thus the positive pressure in the water inlet passage 1 in advance of the water valve 2 will be communicated to the diaphragm 16 through pipe 19 and pressure chamber 17, and as the pressure head decreases the valve 14 will open wider under the influence of its spring 18 thus to insure that a constant pressure will be maintained in the chamber 1 and that, therefore, a constant volume of water will pass valves 14 and 2 to maintain the predetermined graded operation of the injector.

Figure 2:
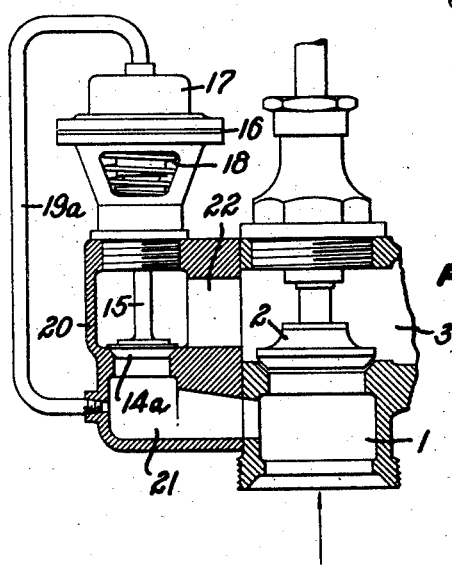
Fig. 2 is a fragmentary sectional elevation of a modified form of means similar to those of Fig. 1 but including a by-pass valve functioning in a different manner to the same end.

It will be obvious that in the arrangement of the valve 14 disclosed in Fig. 1 this valve controls the passage of all water to the injector, but efficient operation may be obtained also, and probably more conveniently, by the arrangement shown in Fig. 2.

In Fig. 2 the valve 14a is a by-pass valve and may be arranged in a by-pass fitting 20 having passages 21 and 22 communicating with the water passages of the injector below and above the water valve 2, respectively, and controlled by the valve 14a. As here shown the positive pressure-communication pipe 19a for the diaphragm chamber 17 is connected with the water inlet 1 outside the valve 14a.

In Figs. 3 and 4 by-pass valves 14b and 14c similar to that of Fig. 2, but differently actuated, are shown.

The arrangement illustrated in Fig. 3 comprises a by-pass fitting 20a in which the by-pass valve 14b seats between passages 21 and 22 under the influence of a properly powered spring 23, and it is provided with a stem extension 15a carrying a piston 24 working in a cylinder 25 connected by a pipe 19b with the combining chamber 7 whereby the positive pressure in the combining chamber is communicated to the cylinder 25 below the piston 24 tending to bias the valve 14b to open position.

The arrangement illustrated in Fig. 4 comprises a by-pass fitting 20b similar to that of Fig. 2, but the valve 14c which controls communication between the passages 21 and 22 around the water valve 2 has its stem 15 connected to a pressure-responsive manner such as a bellows 26 in communication through a pipe 19c with the water passage 3 of the injector. The valve 14c is biased to its seat by a spring 27.

As hereinbefore indicated, with the main water valve 2 in graded position, the positive pressure in the combining chamber 7 has a determinable relation to the pressure head of the water at the water valve 2, and the negative pressure in the water passage 3 likewise has a determinable relation to the pressure head at the water valve 2. Therefore, with such graded adjustment of the water valve, as the pressure head falls off at the valve 2 the increased pressure in the combining chamber 7 will function to open the by-pass valve 14b of Fig. 3; and as the minus pressure in the water passage 3 increases as the pressure head of water at valve 2 decreases, the suction thus communicated to the bellows 26 will open valve 14c of Fig. 4.

In normal operation of injectors of the type illustrated as conventional, it has been found that with the water valve in graded adjustment, and the usual locomotive boiler steam pressure of approximately 200 lbs., an initial head of 11 ft. of cold water (60° F.) in the tank feeding the injector, an initial delivery temperature of 252° F., and an initial combining chamber positive pressure of 13 lbs., and an initial minus pressure or vacuum of 17 in. Hg in the water passages in advance of the lifting nozzle, the delivery temperature, combining chamber pressure and water passage vacuum were all increased as the pressure head of the feed water decreased, and that this condition of increase obtained in substantially constant ratio until the delivery temperature and combining chamber pressure reached the critical point at which the injector would no longer function and would break.

By proper progressive increase in the opening of the water inlet valve, breaking of the injector was obviated, and it was found that most efficient operation was obtained with a delivery temperature not higher than 275° F. and preferably between 270° and 275° F.

Installation of the auxiliary water valve 14, 14a, 14b, 14c and appropriate communicating piping 19, 19a, 19b, 19c, provided a means whereby, with a fixed grading opening of the water valve 2, sufficient additional water was automatically admitted to the injector as the pressure head of the feed water decreased to maintain the temperature and volume of water at delivery substantially constant and avoided breaking until the supply tank was emptied.

Referring further to the arrangement disclosed in Fig. 3, it will be noted that, due to the fact that the by-pass valve 14b is actuated in response to pressure changes occurring in the combining chamber 7, the temperature at delivery may be maintained substantially constant regardless of normal changes in temperature of the water fed to the injector, assuming that the water valve 2 is substantially closed. This is due to the fact that, the delivery temperature being a related function of the combining chamber pressure, and being directly proportional to it, if the delivery temperature increases due to increase in temperature of the feed water, the combining chamber pressure will increase and the by-pass valve 14b will open proportionately wider to admit water in quantity sufficient to maintain the predetermined desired delivery temperature.

Also, with the water valve adjusted for a predetermined grading, especially minimum grading, and the temperature of the water fed to the injector remaining substantially constant, the above described relationship of delivery temperature to combining chamber pressure, and the control of the by-pass water valve being responsive to combining chamber pressure, it will be apparent that the arrangement of Fig. 3 makes possible maintenance of substantially constant delivery volume and temperature.

In the modification shown in Fig. 5, the main water valve is dispensed with, and full control of the admission of water to the injector is obtained by the valve 28 the closing spring 29 of which may be compressed, and thus stiffened in operative effect, by a quick-acting manually adjustable threaded stem member 30. It should be noted, however, that the adjustment of the spring 29, as shown, is such that the pressure of the water fed to the injector will unseat valve 28.

By this arrangement, with the feed water temperature substantially constant, the opening of the valve 28 under pressure communicated to the piston 31 from the combining chamber may be restricted by appropriately adjusting the pressure exerted by the spring 29 to hold the valve closed, and as the delivery temperature and combining chamber pressure are related functions, the valve 28 when set for any delivery temperature within the practical range, will maintain such temperature substantially constant. Similarly, for any predetermined adjustment of pressure on spring 29 the delivery volume also may be maintained substantially constant.

A further advantage of the arrangement disclosed in Fig. 5 is that, by appropriate adjustment of the pressure exerted by the spring 29, the delivery temperature of the water may be maintained substantially constant (and the delivery volume maintained at the amount complemental to such temperature) regardless of changes in temperature and/or pressure of the water fed to the injector. This feature of operation is predicated upon the interrelation of the functions of combining chamber pressure and delivery temperature hereinbefore referred to.

It will be understood that, as initially stated, the object of the invention is to prevent breaking of injector operation when in graded adjustment, and particularly in minimum graded adjustment where the critical zone of operation lies, and it is not intended to function at those settings of the main water valve which permit a relatively free flow of water, or when there is a vacuum, rather than pressure, established in the combining chamber.

Hence, in all forms of the invention, except the forms shown in Figs. 1 and 2, it is presupposed that, in operation of the device of the invention, pressure exists in the combining chamber. As to Figs. 1 and 2 this pressure condition is not essential for the reason that control of the auxiliary water valves of these forms is obtained directly in response to the pressure of the water fed to the injector, regardless of its temperature.

The advantages of automatic injector operation in service, in accordance with the principles of the invention, will be appreciated when it is considered that the engineman once having determined the rate of injector delivery necessary to maintain a desired boiler water level and having appropriately graded the injector by the extent of opening of the water valve 2, need not be aggravated by a cessation of injector operation, but is assured that the injector will continue to operate at adequate delivery volume, sufficient to prevent breaking, so long as there is any water in the feed tank.

Various changes and modifications are considered to be within the spirit of the invention and the scope of the following claims.

We claim:

1. In combination with an injector, a source of liquid to be fed to and delivered by the injector, and means for maintaining substantially constant the volume of delivery of such liquid from the injector, said means including a valve for controlling admission of liquid to the injector, said valve being provided with means responsive to variations in pressure in the liquid during its feed prior to delivery to vary the extent of its opening, such pressure variations being incident to change in pressure at the source of said liquid.

2. In combination with an injector, a source of liquid to be fed to and delivered by the injector, and means for maintaining substantially constant the volume of delivery of such liquid from the injector, said means including a valve for controlling admission of liquid to the injector, said valve being provided with means responsive to variations in pressure in the liquid during its feed prior to delivery to vary the extent of its opening, such pressure variations occurring within the injector body and being incident to change in pressure at the source of said liquid.

3. In combination with an injector, a source of liquid to be fed to and delivered by the injector, and means for maintaining substantially constant the volume of delivery of such liquid from the injector, said means including a valve for controlling admission of liquid to the injector, said valve being provided with means automatically responsive to variations in pressure in the liquid during its feed prior to delivery to vary the extent of its opening, such pressure variations being incident to change in pressure at the source of said liquid.

4. In combination with an injector, a source of feed water, and means for maintaining substantially constant the volume of delivery of water from the injector despite changes in pressure of the feed water, said means including a water valve, and means operatively associated with said valve and responsive to pressure variations in the water during its feed prior to delivery which are incident to change in pressure at the source of the feed water for varying the extent of opening of the valve, whereby said valve will function to vary and to proportionately control admission of water to the injector.

5. In combination with an injector having the usual water inlet valve, a source of feed water, the admission of feed water to the injector being normally controlled by said valve to grade the delivery volume of the injector, and means for maintaining substantially constant the volume of delivery of water from the injector despite changes in pressure of the feed water, said means including a water valve supplementary to said water inlet valve, and means for subjecting said supplementary valve to pressure variations incident to change in pressure of the feed water, whereby as the pressure of the feed water varies the extent of the opening of the supplementary valve will vary to proportionately control admission of water to the injector.

6. In combination with an injector having the usual water inlet valve, a source of feed water, the admission of feed water to the injector being normally controlled by said valve to grade the delivery volume of the injector, and means for maintaining a predetermined related volume and temperature of delivery of water from the injector despite changes in pressure of the feed water, said means including a water valve supplementary to said water inlet valve, and means for subjecting said supplementary valve to pressure variations incident to change in pressure of the feed water, whereby as the pressure of the feed water varies the extent of opening of the supplementary valve will vary to proportionately control admission of water to the injector.

7. In combination with an injector having the usual water inlet valve, a source of feed water, the admission of feed water to the injector being normally controlled by said valve to grade the delivery volume of the injector, and means for maintaining substantially constant the volume of delivery of water from the injector despite changes in pressure of the feed water, said means including a water valve supplementary to said water inlet valve, and means for subjecting said supplementary valve to pressure variations occurring within the injector body incident to change in pressure of the feed water, whereby as the pressure of the feed water varies the extent of opening of the supplementary valve will vary to proportionately control admission of water to the injector.

8. In combination with an injector having the usual water inlet valve, a source of feed water, the admission of feed water to the injector being normally controlled by said valve to grade the delivery volume of the injector, a water valve supplementary to said water inlet valve, and means for subjecting said supplementary valve to pressure variations within the injector body incident to change in temperature of the feed water, whereby as the temperature of the feed water varies the extent of opening of the supplementary valve will vary to proportionately control admission of water to the injector, and thus maintain a predetermined temperature of delivery of the water from the injector despite changes in temperature of the feed water.

9. Control means for an injector, whereby the delivery characteristics thereof may be maintained at a predetermined optimum despite changes in pressure at the source of liquid to be fed to and delivered by the injector, including a valve for controlling the admission of liquid to the injector, and means for varying the extent of opening of said valve, said means being responsive to variations in pressure in the liquid during its feed prior to delivery, such pressure variations being incident to change in pressure at the source of said liquid.

10. Control means for an injector, whereby the delivery characteristics thereof may be maintained at a predetermined optimum despite changes in pressure at the source of liquid to be fed to and by the injector, including a valve for controlling the admission of liquid to the injector, and means for varying the extent of opening of said valve, said means being responsive to variations in pressure in the liquid within the injector body during its feed, such pressure variations being incident to change in pressure at the source of said liquid.

11. Control means for an injector, whereby the delivery characteristics thereof may be maintained at a predetermined optimum despite changes in pressure at the source of liquid to be fed to and by the injector, including a main water inlet valve for controlling the admission of water to the injector to grade the delivery volume, a supplementary water valve, and means for varying the extent of opening of said supplementary valve, said means being responsive to variations in pressure in the liquid during its feed, such pressure variations being incident to change in pressure at the source of said liquid.

12. Control means for an injector, whereby the delivery characteristics thereof may be maintained at a predetermined optimum despite changes in pressure at the source of liquid to be fed to and by the injector, including a main water inlet valve for controlling the admission of water to the injector to grade the delivery volume, a supplementary water valve, and means for varying the extent of opening of said supplementary valve, said means being responsive to variations in pressure in the liquid within the injector body during its feed, such pressure variations being incident to change in pressure at the source of said liquid.

13. Control means for an injector, whereby the temperature of delivery of liquid therefrom may be maintained at a predetermined optimum despite changes in temperature at the source of liquid to be fed to and by the injector, including a valve for controlling the admission of liquid to the injector, and means for varying the extent of opening of said valve, said means being responsive to variations in pressure in the liquid within the injector body during its feed, such pressure variations being incident to change in temperature at the source of said liquid.

14. Control means for an injector, whereby the temperature of delivery of liquid therefrom may be maintained at a predetermined optimum despite changes in temperature at the source of liquid to be fed to and by the injector, including a main liquid inlet valve for controlling the admission of liquid to the injector to grade the delivery volume, a supplementary liquid valve, and means for varying the extent of opening of said supplementary valve, said means being responsive to variations in pressure in the liquid within the injector body during its feed, such pressure variations being incident to change in temperature at the source of said liquid.

15. In combination with an injector, a source of liquid to be fed to and delivered by the injector, and means for maintaining substantially constant the temperature of delivery of such liquid from the injector, said means including a valve for controlling admission of liquid to the injector, said valve being provided with means responsive to variations in pressure in the liquid within the injector body prior to delivery to vary the extent of opening of said valve, such pressure variations being incident to change in pressure at the source of such liquid.

16. In combination with an injector, a source of feed water, a water admission valve, and pressure responsive means operatively associated with said valve for subjecting said valve to pressure variations incident to change in pressure of the feed water, whereby as the pressure of the feed water varies the extent of opening of the valve will vary to proportionately control admission of water to the injector to thus insure maintenance of a predetermined related volume and temperature of the water at delivery.

17. In combination with an injector, a source of liquid to be fed to and delivered by the injector, and means for maintaining substantially constant the temperature of delivery of such liquid from the injector, said means including a valve for controlling admission of liquid to the injector, said valve being provided with means responsive to variations in pressure in the liquid within the injector body prior to delivery to vary the extent of opening of said valve, such pressure variations being incident to change in temperature at the source of such liquid.

18. In a steam operated injector adapted for efficient operation at a delivery temperature not exceeding a predetermined maximum, and in which the delivery temperature and the combining chamber pressure are, fundamentally, related functions, means for preventing increase of delivery temperature above said predetermined maximum by controlling inlet of water to the injector, including a water valve the extent of opening of which is determined by pressure responsive means, and means for subjecting such pressure responsive means to pressure obtaining in the combining chamber.

19. In a steam operated injector adapted for efficient operation at a delivery temperature not exceeding a predetermined maximum, and in which the delivery temperature and the combining chamber pressure are, fundamentally, related functions, means for preventing increase of delivery temperature above such predetermined maximum while maintaining the steam supply constant and varying the delivery volume, by controlling inlet of water to the injector, including a water valve the extent of opening of which is determined by pressure responsive means, and means for subjecting such pressure responsive means to pressure obtaining in the combining chamber.

HOWARD G. DOSTER.
ROBERT H. HANLON.
FORDYCE B. FARNSWORTH.